United States Patent

Miles

(10) Patent No.: US 8,944,223 B2
(45) Date of Patent: Feb. 3, 2015

(54) HYDRAULIC BRAKE HANDLE ASSEMBLY

(75) Inventor: Jason Miles, Mukilteo, WA (US)

(73) Assignee: Tien Hsin Industries Co., Ltd., Taichung County (TW)

(*) Notice: Subject to any disclaimer, the term of this patent is extended or adjusted under 35 U.S.C. 154(b) by 149 days.

(21) Appl. No.: 13/598,833

(22) Filed: Aug. 30, 2012

(65) Prior Publication Data

US 2014/0060986 A1    Mar. 6, 2014

(51) Int. Cl.
*B60T 11/00* (2006.01)

(52) U.S. Cl.
USPC .......................................... 188/344; 188/345

(58) Field of Classification Search
CPC ..... B60T 11/203; B60T 11/224; B60T 11/24; B60T 11/20; B60T 7/102
USPC .............. 188/24.22, 152, 344, 348, 347, 345; 60/574, 576, 578
See application file for complete search history.

(56) References Cited

U.S. PATENT DOCUMENTS

| | | | | |
|---|---|---|---|---|
| 2,213,947 A | * | 9/1940 | Bowen | 188/354 |
| 2,341,318 A | * | 2/1944 | Forbes | 60/577 |
| 3,907,375 A | * | 9/1975 | Lewis et al. | 303/6.01 |
| 5,632,362 A | * | 5/1997 | Leitner | 188/344 |
| 8,459,420 B2 | * | 6/2013 | Tsai | 188/344 |
| 2002/0070084 A1 | * | 6/2002 | Chou | 188/24.11 |

FOREIGN PATENT DOCUMENTS

| FR | 782865 A | * | 3/1935 | ............ B60T 11/224 |
|---|---|---|---|---|
| FR | 2575991 A1 | * | 7/1986 | ................ B62L 1/10 |

* cited by examiner

*Primary Examiner* — Bradley King
*Assistant Examiner* — Stephen Bowes
(74) *Attorney, Agent, or Firm* — Rosenberg, Klein & Lee (57) ABSTRACT

A hydraulic brake handle assembly, wherein the response time of the hydraulic brake caliper can be much improved, and the brake action can be carried out immediately. When the brake lever is pressed, the volume of the oil pushed by the piston is doubled due to the hydraulic brake handle assembly is provided with two piston portions inserted in two oil chambers. Since the response time of the hydraulic caliper of the present invention is improved, it allows the brake pads of the hydraulic caliper to be assembled at a relatively large distance from the brake disc, so that sand won't get struck between the brake pads and the brake disc, and the brake disc remains useful when they are bent out of plain rubbing after using.

7 Claims, 12 Drawing Sheets

HYDRAULIC BRAKE HANDLE ASSEMBLY

BACKGROUND OF THE INVENTION

1. Field of the Invention

The present invention relates to a brake handle assembly for a bicycle, and more particularly to a hydraulic brake handle assembly for a bicycle.

2. Description of Related Art

Bicycle brake generally includes steel cord type brake and hydraulic type brake. The hydraulic brake is normally driven by a hydraulic brake handle assembly disposed on the handlebar of a bicycle, and in the brake handle assembly is provided a piston cylinder which is only formed with a single of chamber. Hence, the response time of the hydraulic brake caliper to the action of pressing the brake lever is relatively longer, namely, the brake action of the caliper is not immediately actuated and little delayed, when the brake lever is pressed.

For the above reason, when the brake assembly is assembled, the distance between the brake pads and the brake disc of the conventional hydraulic brake is normally reduced a small extent in order to overcome the problem of the brake action delay. However, this assembling method is likely to cause sand to get stuck between the brakes pads and the disc, causing noise and wear of the brake pads and disc and further causing inconvenience of cleaning the sand. In addition brake disks are relatively thin and can be easily bent out of plane. Due to the small pad clearance, even a slightly out of true brake disk can also cause undesired noise and wear.

The present invention, has arisen to mitigate and/or obviate the afore-described disadvantages.

SUMMARY OF THE INVENTION

The primary object of the present invention is to provide a hydraulic brake handle assembly, wherein the response time of the hydraulic brake caliper can be much improved and the brake action can be carried out immediately when the brake lever is pressed.

Another object of the present invention is to provide a hydraulic brake handle assembly which allows the brake pads of the hydraulic caliper to be assembled at a relatively large distance from the brake disc, so that sand won't get struck between the brake pads and the brake disc. So out of true brake disks can be used. This improvement reduces noise and wear of the brake pads and disc, making it easy to clean the sand and decreasing service time spent truing brake disks.

To achieve the above object a hydraulic brake handle assembly is provided which comprises: a body, a brake lever, a piston and a first spring. The body includes a mounting portion to be mounted on a handlebar of a bicycle, a first oil chamber, an outlet in communication with the first oil chamber, a second oil chamber, a first passage in communication with the first and second oil chambers, a distribution chamber, a front distribution passage in communication with the second oil chamber and the distribution chamber, a rear distribution passage in communication with the second oil chamber and the distribution chamber, an oil reserve chamber, and a second passage in communication with the second oil chamber and the oil reserve chamber. The brake lever is pivoted to the body and includes a pressing portion and a driving portion. The piston includes a driven portion driven by the driving portion, a first piston portion connected to the driven portion and movably disposed in the first oil chamber, and a second piston portion connected to the driven portion and movably disposed in the second oil chamber.

The first spring is disposed between the first oil chamber and the first piston portion and extends in a moving direction of the first piston portion. The second spring extends in a moving direction or the second piston portion and is disposed between the second oil chamber and the second piston portion.

DETAILED DESCRIPTION OF THE INVENTION

The present invention will be clearer from the following description when viewed together with the accompanying drawings, which show, for purpose of illustrations only, the preferred embodiment in accordance with the present invention.

Referring to FIGS. 1-10, a hydraulic brake handle assembly in accordance with the present invention is mounted on a handlebar 11 of a bicycle to control a hydraulic brake caliper 12 and essentially comprises a body 20, a brake lever 30, a piston 40, a first spring 50 and a second spring 60.

The body 20 includes a mounting portion 21 mounted on the handlebar 11, a first oil chamber 22, an outlet 23 in communication with the first oil chamber 22, a second oil chamber 24, a first passage 251 in communication with the first and second oil chambers 22, 24, a distribution chamber 46, a front distribution passage 252 in communication with the second oil chamber 24 and the distribution chamber 26, a rear distribution passage 253 in communication with the second oil chamber 24 and the distribution chamber 26, an oil reserve chamber 27, and a second passage 254 in communication with the second oil chamber 24 and the oil reserve chamber 27. In the oil reserve chamber 27 is disposed a removable plug 28.

The brake lever 30 is pivoted to the body 20 and includes a pressing portion 31 and a driving portion 32.

The piston 40 includes a driven portion 41 driven by the driving portion 32, a first piston portion 42 connected to the driven portion 41 and movably disposed in the first oil chamber 22, and a second piston portion 43 connected to the driven portion 41 and movably disposed in the second oil chamber 24. On the outer periphery of the first and second piston portions 42, 43 are annular seals 44 to enable the first and second piston portions 42, 43 to be disposed in the first and second oil chamber 22, 24 in an airtight manner.

Figure 1:
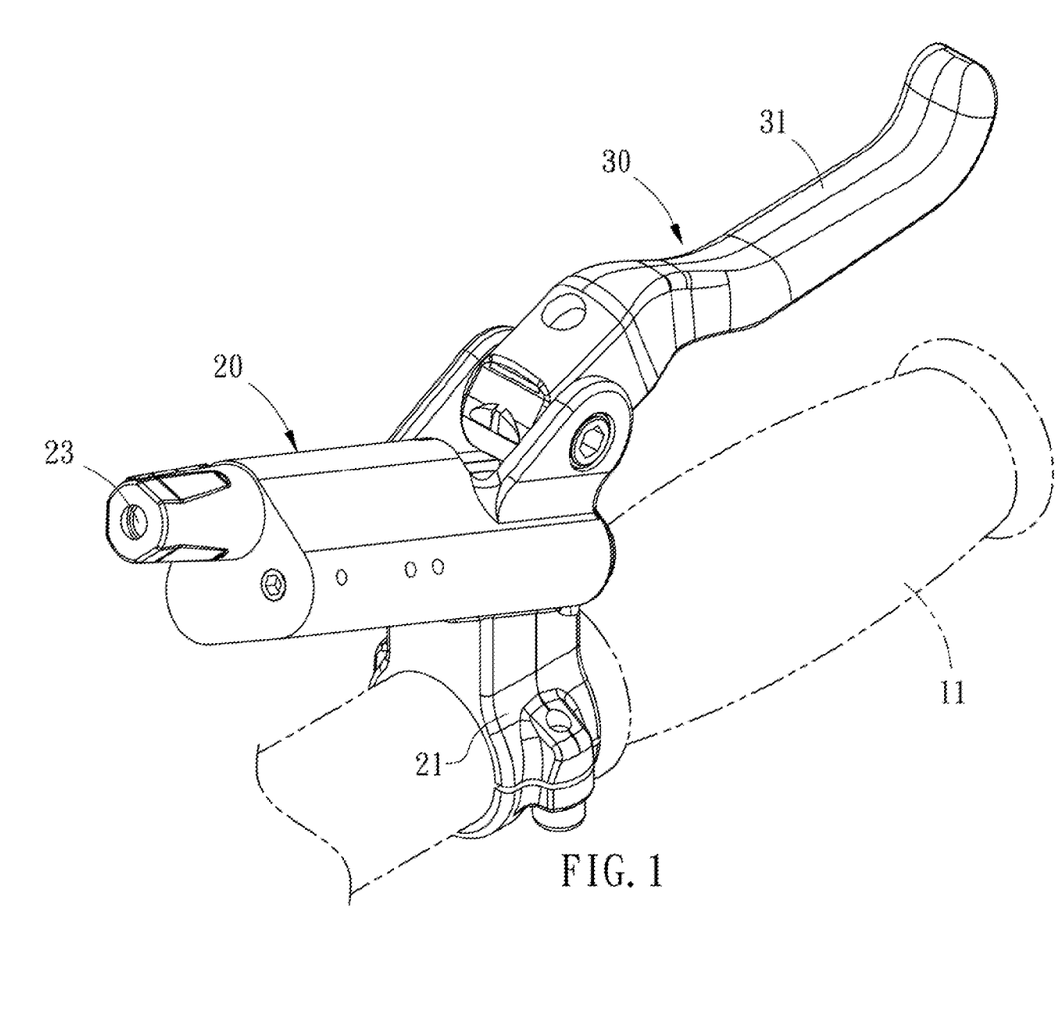
FIG. 1 is a perspective view showing that a hydraulic brake handle assembly in accordance with the present invention is mounted on the handlebar of a bicycle.
Figure 2:
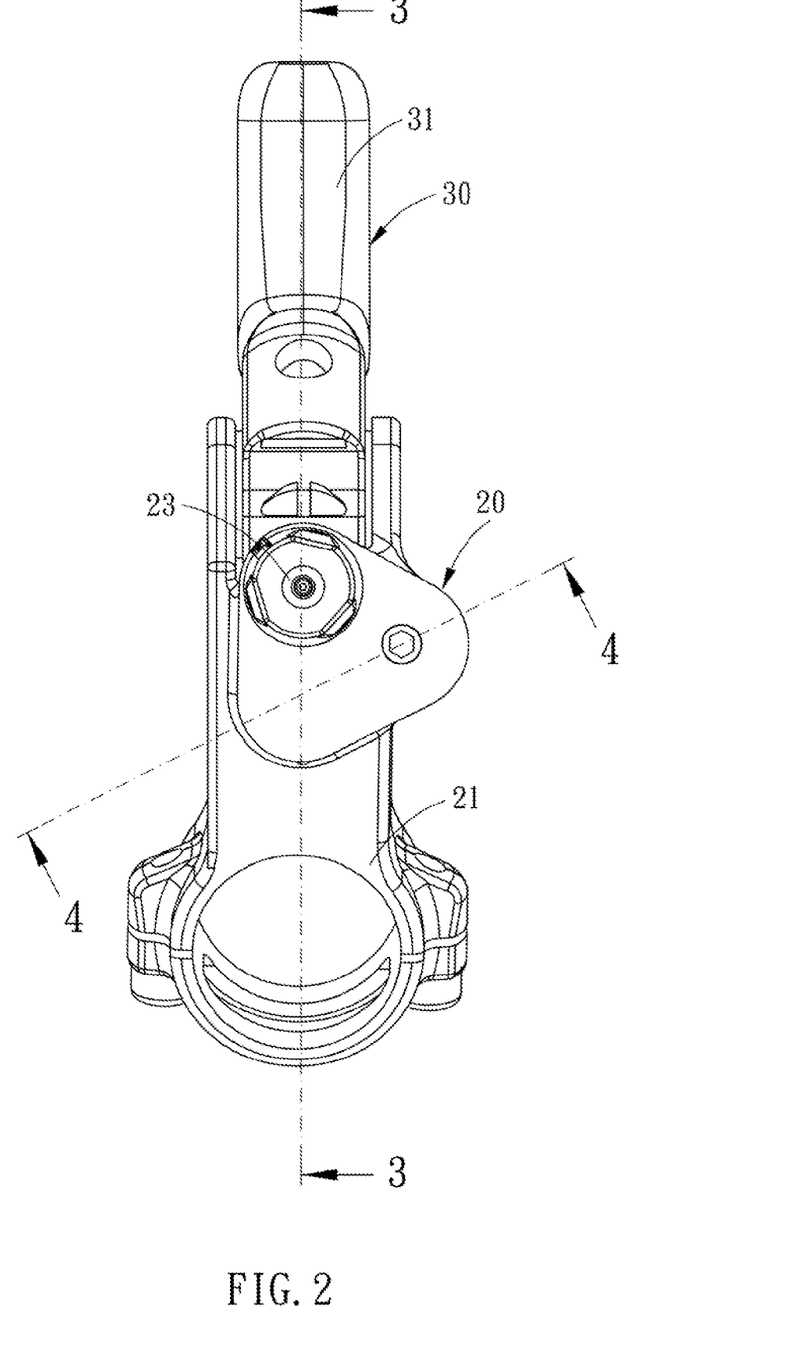
FIG. 2 is a left-side view of the hydraulic brake handle assembly in accordance with the present invention.
Figure 3:
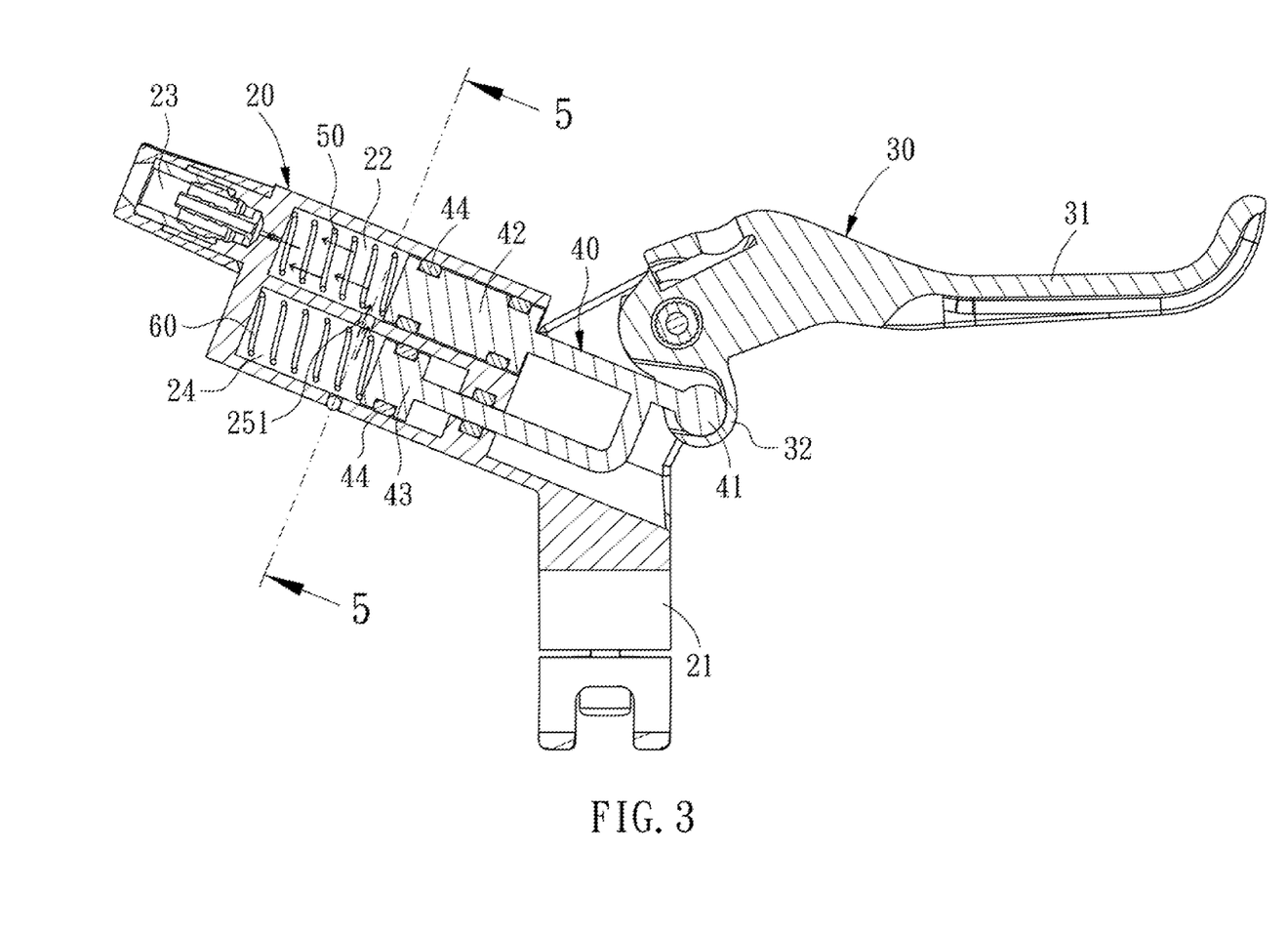
FIG. 3 is a cross sectional view taken along the line 3-3 of FIG. 2 showing that the status before the brake lever is pressed and the piston is not moved.
Figure 4:
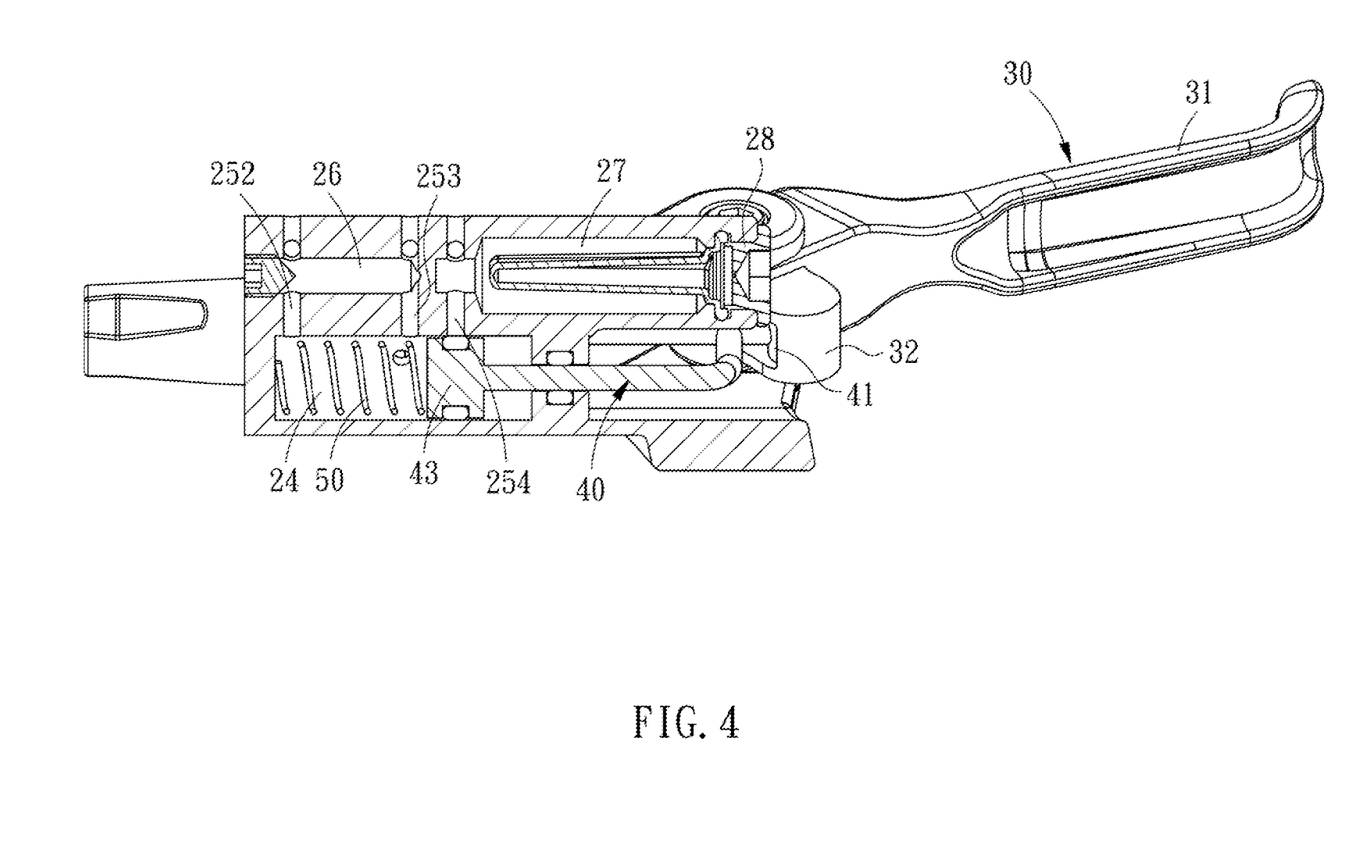
FIG. 4 is a cross sectional view taken along the line 4-4 of FIG. 2 showing that the status before the brake lever is pressed and the piston is not moved.
Figure 5:
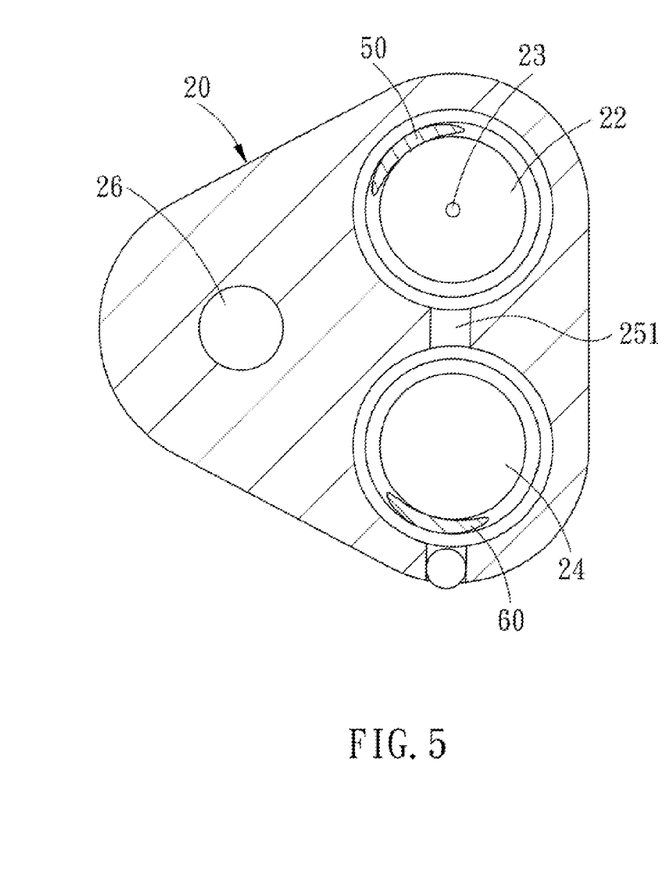
FIG. 5 is a cross sectional view taken along the lint 5-5 of FIG. 3.
Figure 6:
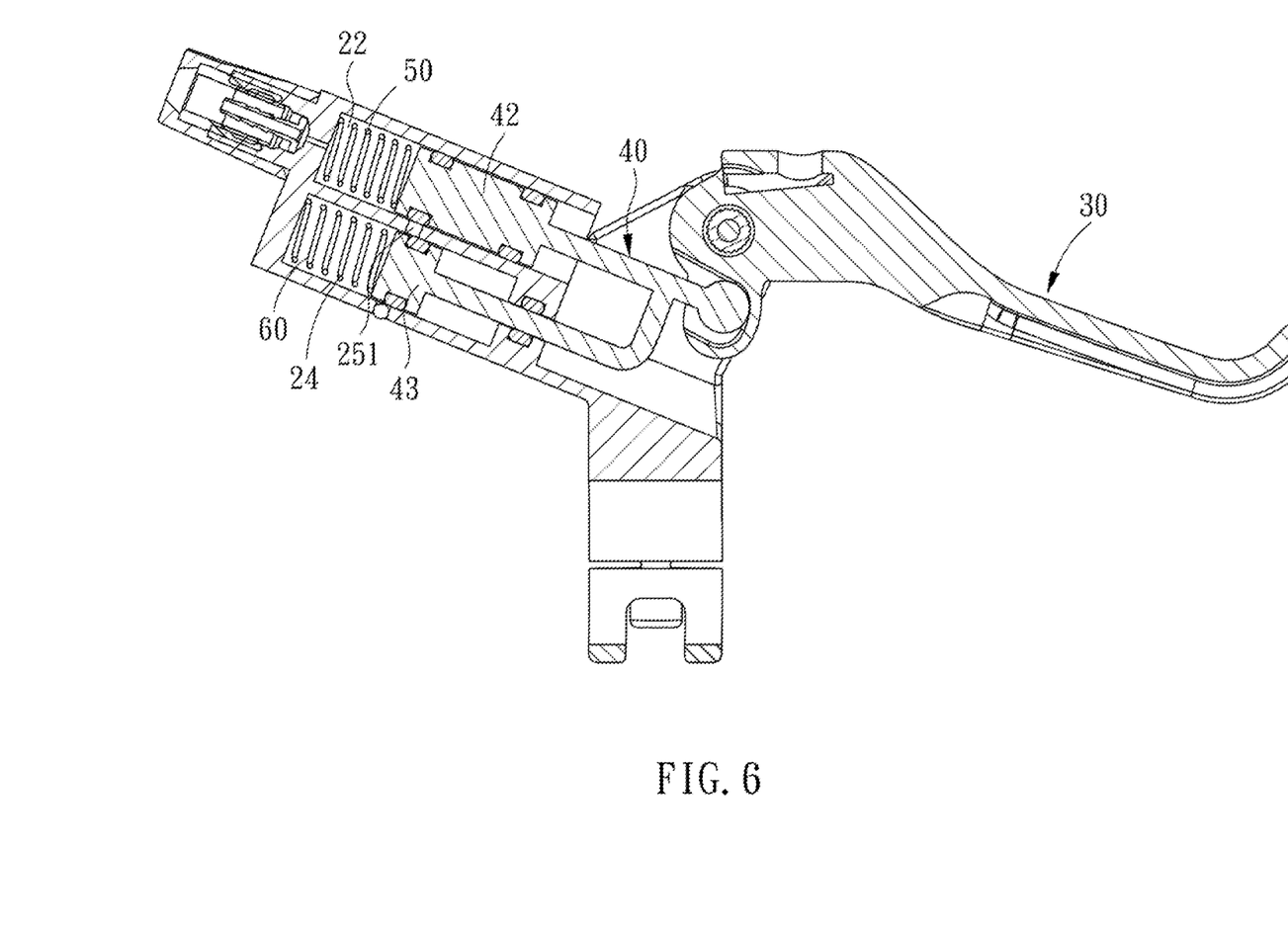
FIG. 6 is an operational view of the present invention showing that the brake lever is being pressed to drive the piston to move.
Figure 7:
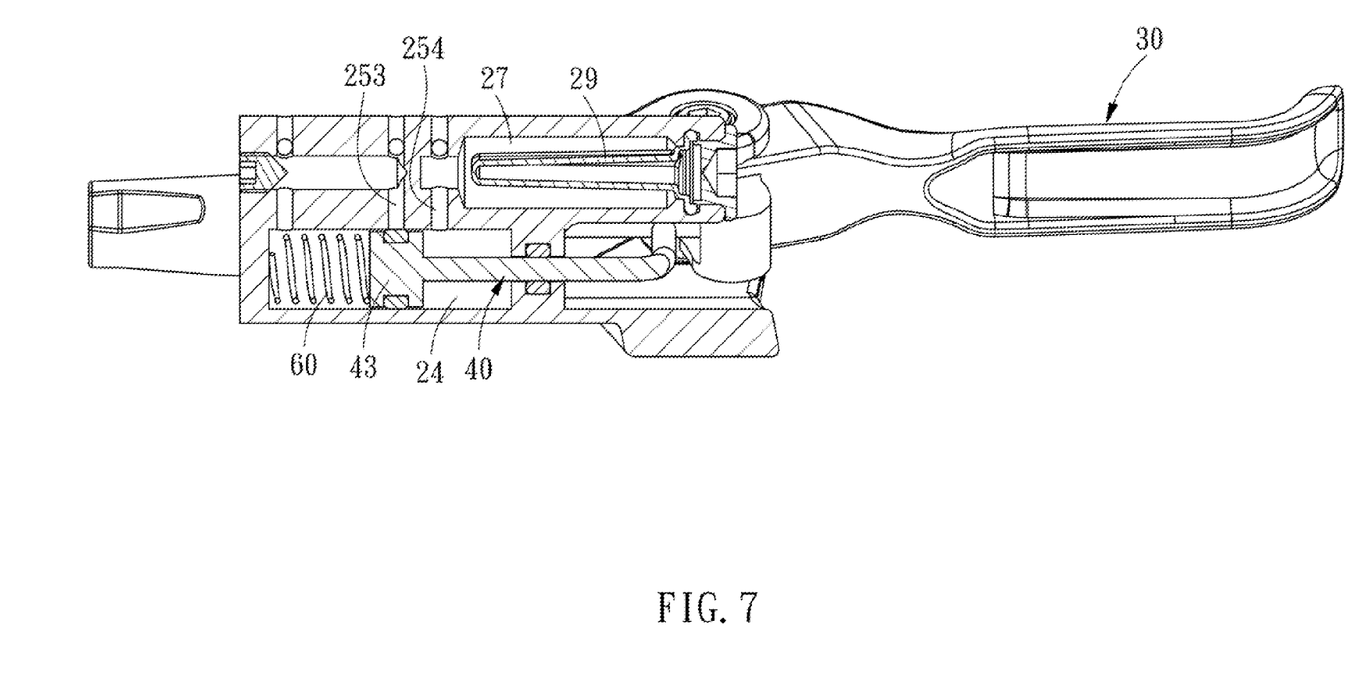
FIG. 7 is an operational view from another angle showing that the brake lever of the present invention is being pressed to drive the piston to move.
Figure 8:
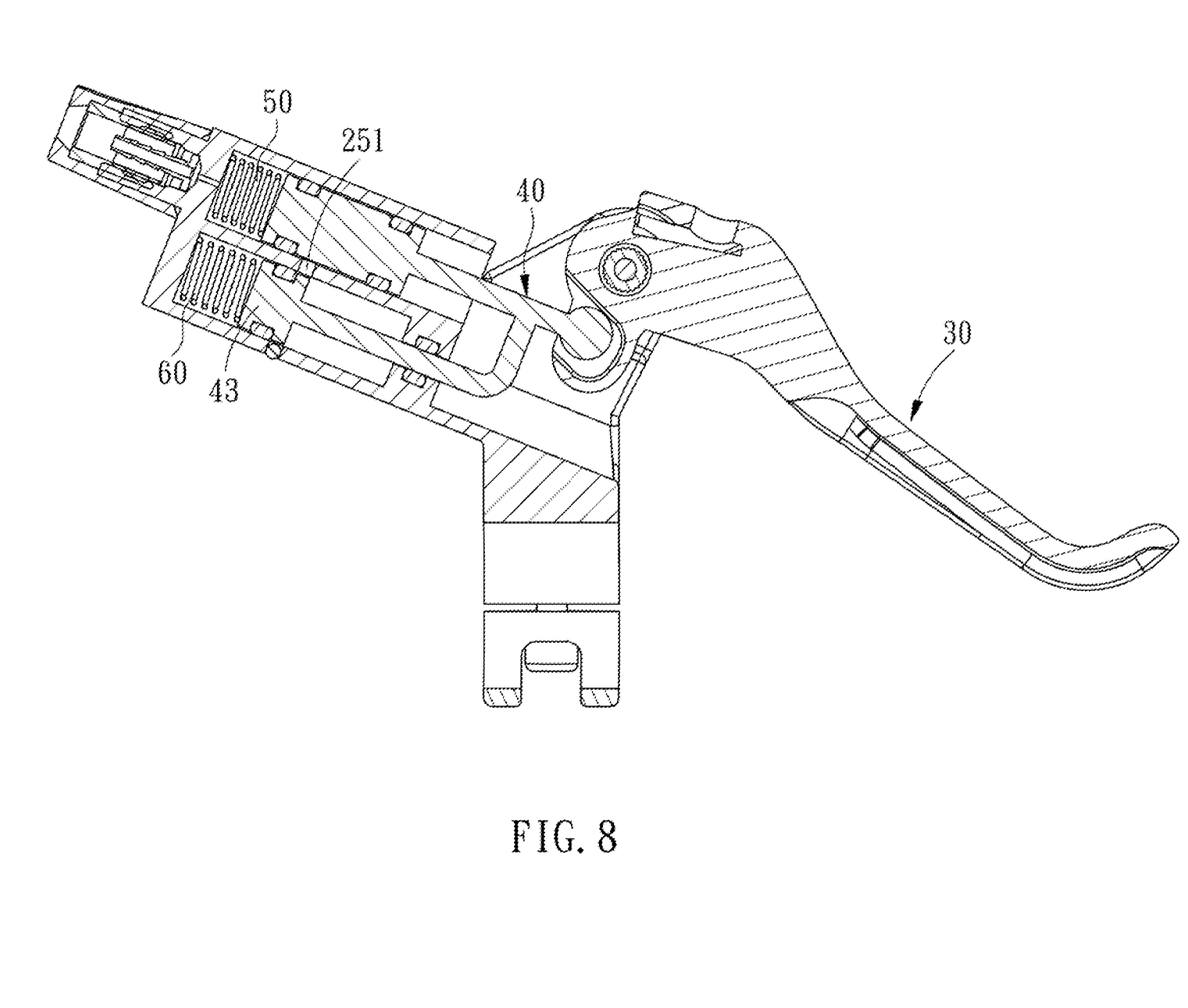
FIG. 8 is another operational view of the present invention showing the status after the brake lever is pressed to move the piston.
Figure 9:
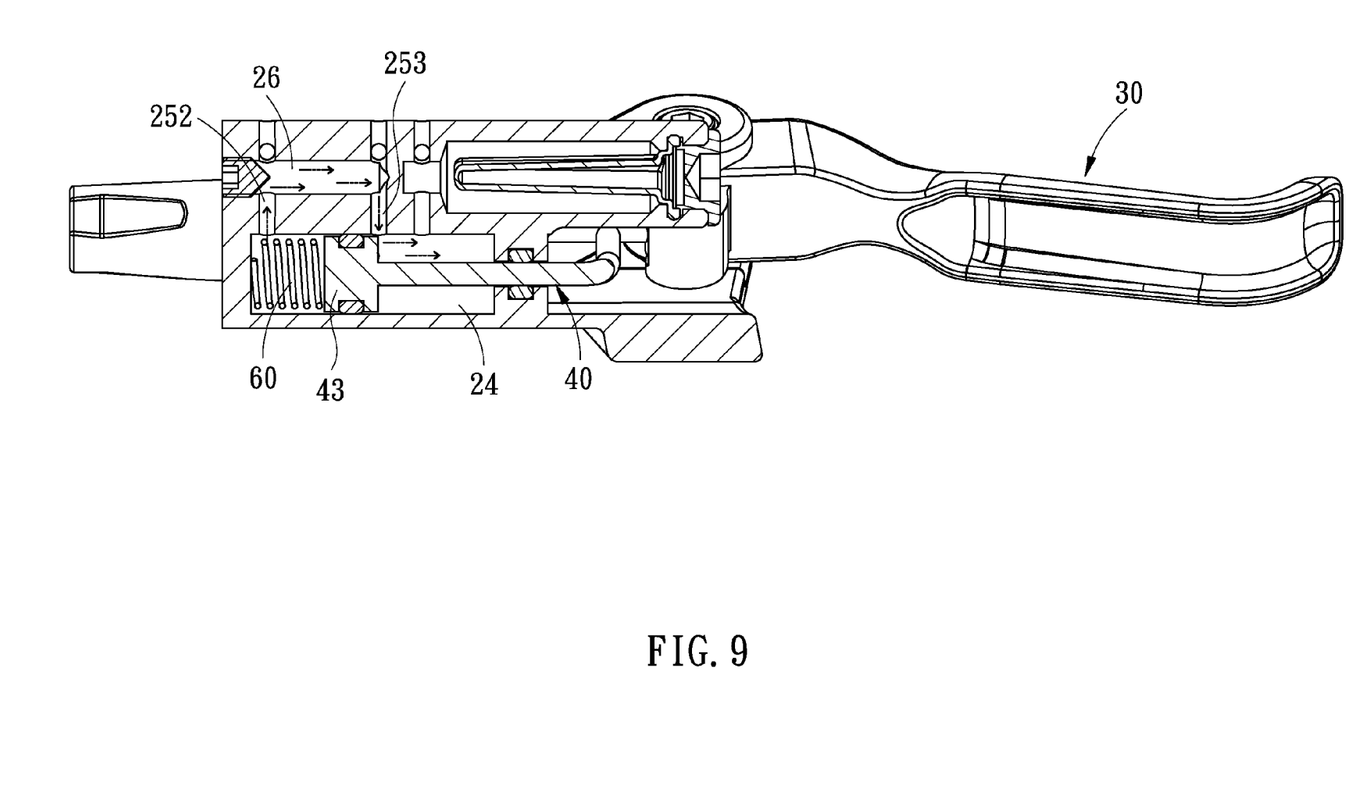
FIG. 9 is another operational view from another angle showing the status after the brake lever is pressed to move the piston.

When the piston 40 is in a first position, as shown in FIGS. 3 and 4, the second piston portion 43 only seals the second passage 254. When the piston 40 is in a second position, as shown in FIGS. 6 and 7, the second piston portion 43 only seals the rear distribution passage 253, and the first piston portion 42 seals the first passage 251. When the piston 40 is in the third position as shown in FIGS. 8 and 9, the first piston portion 42 only seals the first passage 251 and the second piston portion 43 is located between the front and rear distribution passages 252, 253.

It is to be noted that the first position means the position when the brake lever 30 is not pressed and doesn't drive the piston 40 to move, as shown in FIGS. 3 and 4. The second position means the position when the brake lever 30 is being pressed to drive the piston 40 to move, as shown in FIGS. 6 and 7. The third position means the position after the brake lever 30 is pressed and drives the piston 40 to move, as shown in FIGS. 8 and 9.

The first spring 50 is a compression spring disposed between the first oil chamber 22 and the first piston portion 42, extending in the moving direction of the first piston portion 42 to provide an elastic compression force when the first piston portion 42 moves towards the outlet 23.

The second spring 60 is a compression spring, extending in the moving direction of the second piston portion 43 and disposed between the second oil chamber 24 and the second piston portion 43 to provide an elastic compression force when the second piston portion 43 moves towards the outlet 23.

In FIGS. 6 and 7 the brake lever 30 is being pressed, namely, the piston 40 is in the second position. When the second piston portion 43 is in the process of moving towards the second position from the first position, the oil in the second oil chamber 24 will flow to the first oil chamber 22 via the first passage 251 and flow out of the outlet 23. Meanwhile, the oil in the first passage 251 will also flow out of the outlet 23. The oil won't stop flowing from the second oil chamber 24 to the first oil chamber 22 until the first piston portion 42 seals the first passage 251, so as to control the action of the hydraulic brake caliper 12.

Figure 10:
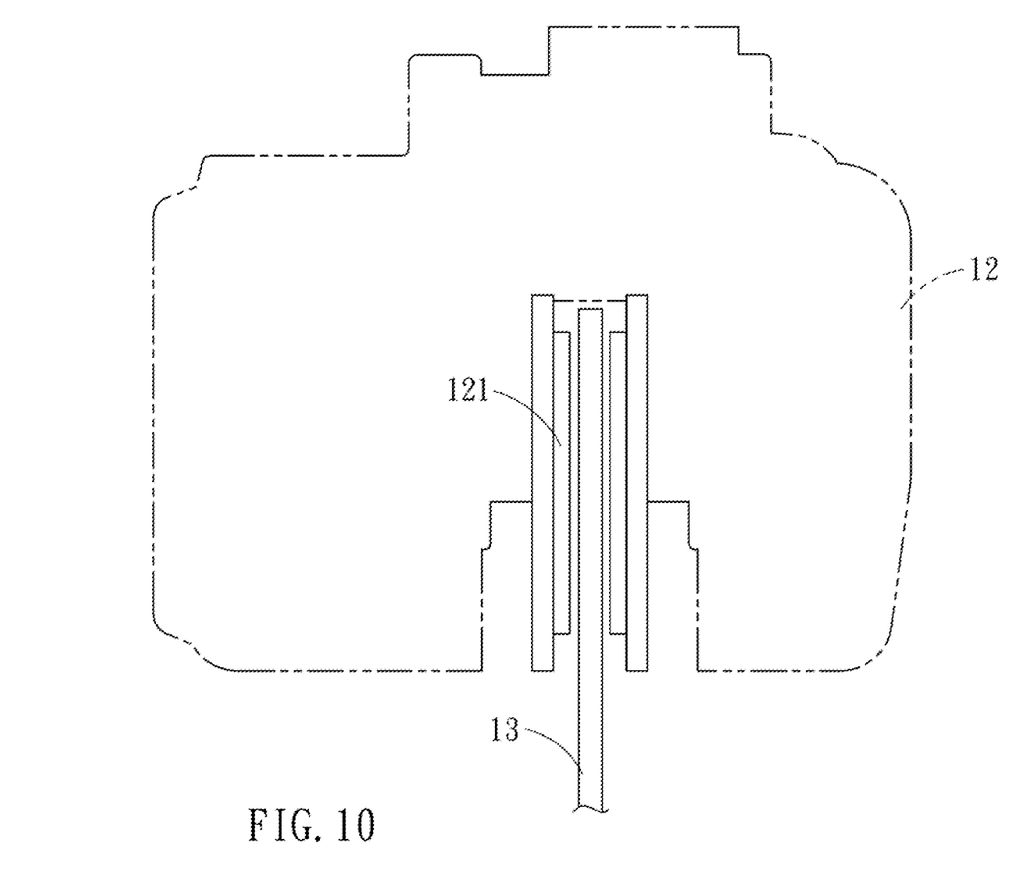
FIG. 10 shows the hydraulic brake caliper in accordance with the present invention and the brake disc.

Hence, when the second piston portion is moving from the first position to the second position, the action of the hydraulic brake caliper 12 is controlled by the volume of oil pushed by the piston 40, so that the response time of the hydraulic brake caliper 12 is improved since the volume of the oil pushed by the piston 40 is doubled due to the piston 40 has the first and second piston portions 42, 43 simultaneously inserted in the first and second oil chambers 22, 24. If the distance between the brake pads 121 and the brake disc 13 of the conventional hydraulic caliper is the same as that of the hydraulic caliper of the present invention, the response time of the hydraulic caliper of the present invention would be much faster than the conventional hydraulic caliper which is only formed with a single oil chamber.

On the other hand, since the response time of the hydraulic caliper of the present invention is improved, it allows the brake pads 121 of the hydraulic brake caliper 12 to be assembled at a relatively large distance from the brake disc 13, so that sand won't get struck between the brake pads 121 and the brake disc 13, which reduces noise and wear of the brake pads and disc while making it easier to clean the sand. In addition, because the brake disc 13 is usually thin to save weight, when they are bent slightly out of plain, undesired rubbing occurs while not braking, the present invention can keep the brake disc 13 useful in virtue of the hydraulic brake caliper 12 is assembled with the pads positioned at a relatively large distance from the brake disc 13.

Referring to FIGS. 8 and 9, which show the status of the brake lever 30 after it is pressed, namely, the piston 40 is in the third position. Since the first piston portion 42 keeps sealing the first passage 251 while the second piston portion 43 is located between the front and rear distribution passages 252, 253, when the second piston portion 43 is moving from the second position toward the third position, the oil pushed by the second piston portion 43 will flow through the front distribution passage 252, the distribution chamber 26 and the rear distribution passage 253 and flow back into the second oil chamber 24 behind the second piston portion 43, canceling the effect of the second oil chamber 24.

It's critical to note that, when the piston 40 is in the first position, the volume of the oil pushed by the piston 40 is higher because piston 40 has the first and second piston portions 42, 43 simultaneously displacing oil to the outlet 23 from the first and second oil chambers 22, 24. A result of this increase is that at the first position the Mechanical Advantage of the hydraulic brake handle assembly is relatively low. When the piston 40 is in the second position, the oil will stop flowing from the second oil chamber 24 to the first oil chamber 22 because the first piston portion 42 seals the first passage 251. This will decrease the volume of oil displaced by piston 40 to the outlet 23. At this moment, the Mechanical Advantage is increased and overall the braking becomes more powerful.

The location of the second piston portion 43 is controlled relative to the starting clearance between the pads 121 and the brake disk 13. The position is controlled so that at the second position or shortly after, the brake pads 121 contact the brake disk 13. Because the brake pads 121 do not contact the brake disc 13 when the piston is located between the first and second positions, the low Mechanical Advantage won't result in any decrease in breaking power. In other words, the brake pads 121 move quickly before the piston 40 is in the second position and move more slowly with high power in the next stage.

Following the process that the brake lever 30 was pressed, once the brake lever 30 is released, the first and second springs 50, 60 will be decompressed to push the first and second piston portions 42, 43 back to their original positions. Meanwhile, the piston 40 will also push the brake lever 30 back to its original position, making the brake lever 30 ready for the next brake operation.

Figure 11:
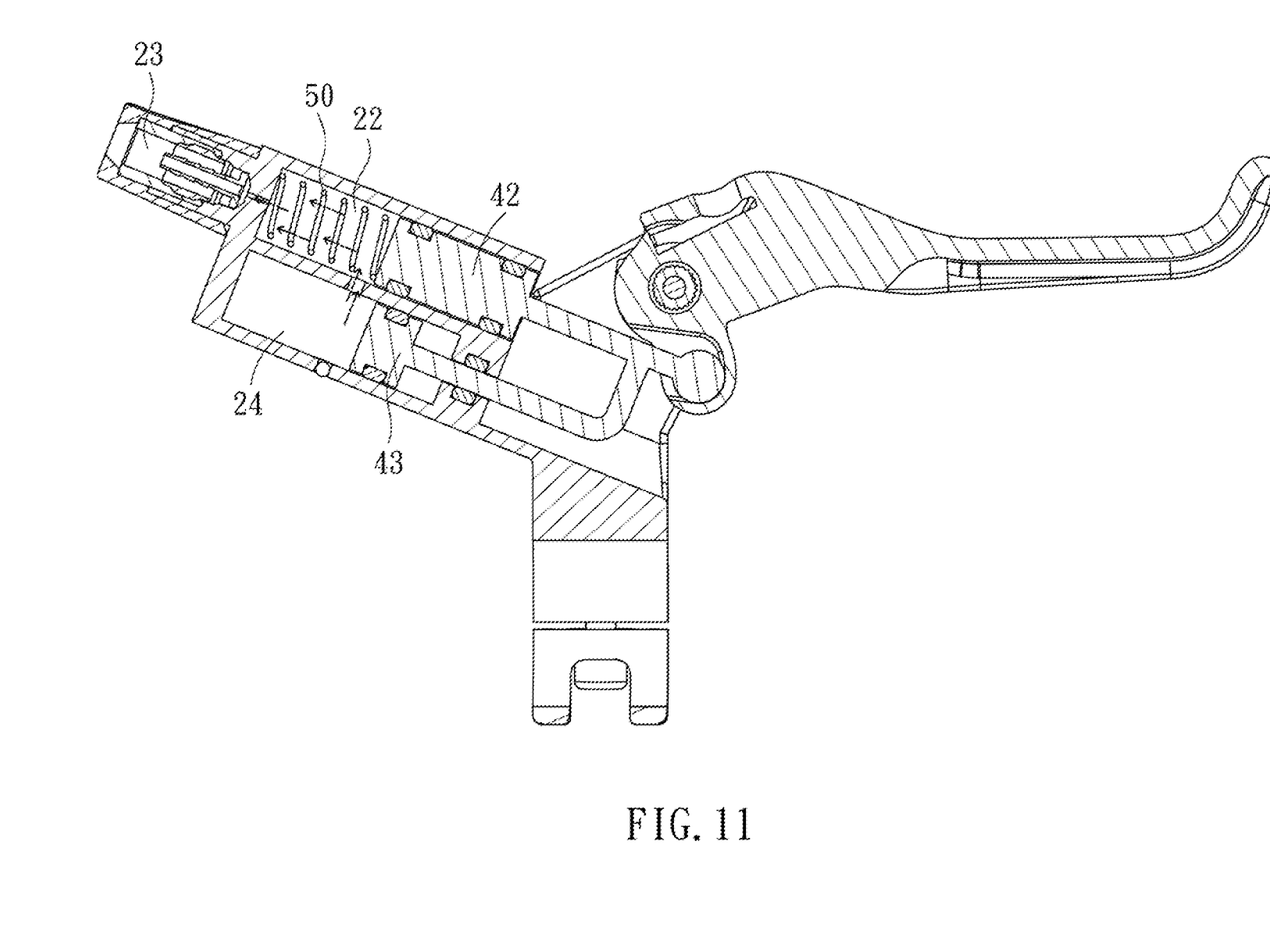
FIG. 11 shows another embodiment of the present invention, in which only a first spring is used.
Figure 12:
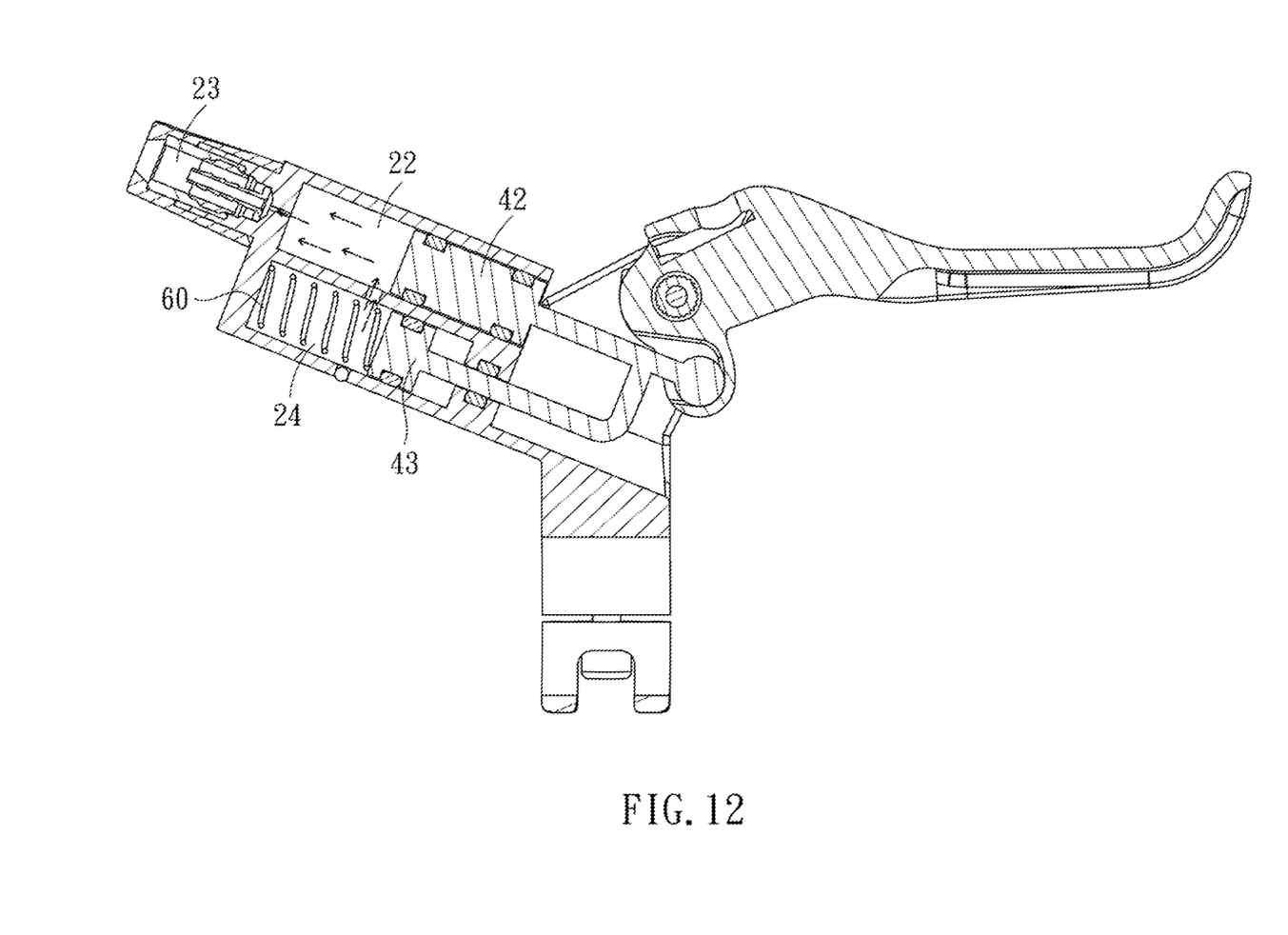
FIG. 12 shows a further embodiment of the present invention, in which only a second spring is used.

Referring to FIG. 11, the present invention can only use the first spring 50 which is disposed between the first oil chamber 22 and the first piston portion 42, extending in the moving direction of the first piston portion 42 to provide an elastic compression force when the first and second piston portions 42, 43 move towards the outlet 23. Or as shown in FIG. 12, the present invention can only use the second spring 60 which extends in the moving direction of the second piston portion 43 and disposed between the second oil chamber 24 and the second piston portion 43 to provide an elastic compression force when the first and second piston portions 42, 43 move towards the outlet 23.

While we have shown and described various embodiments in accordance with the present invention, it is clear to those skilled in the art that further embodiments may be made without departing from the scope of the present invention.

What is claimed is:

1. A hydraulic brake handle assembly, adapted to be mounted on a handlebar of a bicycle, comprising:
   a body, including a mounting portion to be mounted on the handlebar, a first oil chamber, an outlet in communication with the first oil chamber, a second oil chamber, a first passage in communication with the first and second oil chambers, a distribution chamber, a front distribution passage in communication with the second oil chamber and the distribution chamber, a rear distribution passage in communication with the second oil chamber and the distribution chamber, an oil reserve chamber, and a second passage in communication with the second oil chamber and the oil reserve chamber;
   a brake lever, pivoted to the body and including a pressing portion and a driving portion;
   a piston, including a driven portion driven by the driving portion, a first piston portion connected to the driven portion and movably disposed in the first oil chamber, and a second piston portion connected to the driven portion and movably disposed in the second oil chamber; and
   a first spring, disposed between the first oil chamber and the first piston portion and extending in a moving direction of the first piston portion;
   wherein when the piston is in a first position, the second piston portion only seals the second passage, when the piston is in a second position, the second piston portion only seals the rear distribution passage and the first piston portion seals the first passage, when the piston is in a third position, the first piston portion only seals the first passage.

2. The hydraulic brake handle assembly as claimed in claim 1, wherein a plug is disposed in the oil reserve chamber.

3. The hydraulic brake handle assembly as claimed in claim 1, wherein the second piston portion, when in the third position, is located between the front and rear distribution passages.

4. The hydraulic brake handle assembly as claimed in claim 1 further comprising a second spring which extends in a moving direction of the second piston portion and is disposed between the second oil chamber and the second piston portion.

5. A hydraulic brake handle assembly comprising:
   a body, including a mounting portion to be mounted on a handlebar of a bicycle, a first oil chamber, an outlet in communication with the first oil chamber, a second oil chamber, a first passage in communication with the first and second oil chambers, a distribution chamber, a front distribution passage in communication with the second oil chamber and the distribution chamber, a rear distribution passage in communication with the second oil chamber and the distribution chamber, an oil reserve chamber, and a second passage in communication with the second oil chamber and the oil reserve chamber;
   a brake lever, pivoted to the body and including a pressing portion and a driving portion;
   a piston, including a driven portion driven by the driving portion, a first piston portion connected to the driven portion and movably disposed in the first oil chamber, and a second piston portion connected to the driven portion and movably disposed in the second oil chamber; and
   a spring, extending in a moving direction of the second piston portion and disposed between the second oil chamber and the second piston portion;
   wherein when the piston is in a first position, the second piston portion only seals the second passage, when the piston is in a second position, the second piston portion only seals the rear distribution passage and the first piston portion seals the first passage, when the piston is in a third position, the first piston portion only seals the first passage.

6. The hydraulic brake handle assembly as claimed in claim 5, wherein the second piston portion, when in the third position, is located between the front and rear distribution passages.

7. The hydraulic brake handle assembly as claimed in claim 5 further comprising another spring which is disposed between the first oil chamber and the first piston portion and extends in a moving direction of the first piston portion.

* * * * *